United States Patent
Stager et al.

(10) Patent No.: US 7,406,488 B2
(45) Date of Patent: Jul. 29, 2008

(54) METHOD AND SYSTEM FOR MAINTAINING DATA IN A CONTINUOUS DATA PROTECTION SYSTEM

(75) Inventors: Roger Keith Stager, Livermore, CA (US); Donald Alvin Trimmer, Livermore, CA (US); Pawan Saxena, Pleasanton, CA (US); Randall Johnson, Pleasant Grove, UT (US); Craig Anthony Johnston, Livermore, CA (US); Yafen Peggy Chang, Fremont, CA (US); Rico Blaser, San Francisco, CA (US)

(73) Assignee: NetApp, Sunnyvale, CA (US)

( * ) Notice: Subject to any disclaimer, the term of this patent is extended or adjusted under 35 U.S.C. 154(b) by 254 days.

(21) Appl. No.: 10/772,643

(22) Filed: Feb. 5, 2004

(65) Prior Publication Data

US 2005/0171979 A1 Aug. 4, 2005

Related U.S. Application Data

(60) Provisional application No. 60/541,626, filed on Feb. 4, 2004, provisional application No. 60/542,011, filed on Feb. 5, 2004.

(51) Int. Cl.
*G06F 17/30* (2006.01)

(52) U.S. Cl. ............................. 707/204; 707/1; 707/100; 707/101; 707/102; 707/103 R; 707/200; 707/201; 707/202; 709/213

(58) Field of Classification Search ................. 707/200, 707/202; 709/213
See application file for complete search history.

(56) References Cited

U.S. PATENT DOCUMENTS

| 4,635,145 A | 1/1987 | Horie et al. |
| 4,727,512 A | 2/1988 | Birkner et al. |
| 4,775,969 A | 10/1988 | Osterlund |
| 5,235,695 A | 8/1993 | Pence |

(Continued)

FOREIGN PATENT DOCUMENTS

EP    1333379    4/2006

(Continued)

OTHER PUBLICATIONS

Camphuisen, Alicia, "Hitachi Inks OEM Deal with Legato" Knapp Comm., Jul. 17, 2002.

(Continued)

*Primary Examiner*—Christian Chace
*Assistant Examiner*—Farhan M Syed
(74) *Attorney, Agent, or Firm*—Volpe and Koenig, P.C.

(57) ABSTRACT

A method and system where data is maintained in a continuous data protection system is disclosed. A primary volume may be protected according to an any-point-in-time (APIT) window wherein restores may be performed at any time as desired. The APIT window may be of any time duration as desired. Outside of the APIT window, a retention policy for phasing out data may be established as desired.

33 Claims, 7 Drawing Sheets

U.S. PATENT DOCUMENTS

| | | |
|---|---|---|
| 5,297,124 A | 3/1994 | Plotkin et al. |
| 5,438,674 A | 8/1995 | Keele et al. |
| 5,455,926 A | 10/1995 | Keele et al. |
| 5,485,321 A | 1/1996 | Leonhardt et al. |
| 5,666,538 A | 9/1997 | DeNicola |
| 5,673,382 A | 9/1997 | Cannon et al. |
| 5,774,292 A | 6/1998 | Georgiou et al. |
| 5,774,643 A | 6/1998 | Lubbers et al. |
| 5,774,715 A | 6/1998 | Madany et al. |
| 5,805,864 A | 9/1998 | Carlson et al. |
| 5,809,511 A | 9/1998 | Peake |
| 5,809,543 A | 9/1998 | Byers et al. |
| 5,854,720 A | 12/1998 | Shrinkle et al. |
| 5,864,346 A | 1/1999 | Yokoi et al. |
| 5,872,669 A | 2/1999 | Morehouse et al. |
| 5,875,479 A | 2/1999 | Blount et al. |
| 5,911,779 A | 6/1999 | Stallmo et al. |
| 5,949,970 A | 9/1999 | Sipple et al. |
| 5,961,613 A | 10/1999 | DeNicola |
| 5,963,971 A | 10/1999 | Fosler et al. |
| 5,974,424 A | 10/1999 | Schmuck et al. |
| 6,021,408 A | 2/2000 | Ledain et al. |
| 6,023,709 A | 2/2000 | Anglin et al. |
| 6,029,179 A | 2/2000 | Kishi |
| 6,041,329 A | 3/2000 | Kishi |
| 6,044,442 A | 3/2000 | Jesionowski |
| 6,049,848 A | 4/2000 | Yates et al. |
| 6,061,309 A | 5/2000 | Gallo et al. |
| 6,067,587 A | 5/2000 | Miller et al. |
| 6,070,224 A | 5/2000 | LeCrone et al. |
| 6,098,148 A | 8/2000 | Carlson |
| 6,128,698 A | 10/2000 | Georgis |
| 6,131,142 A | 10/2000 | Kamo et al. |
| 6,131,148 A | 10/2000 | West et al. |
| 6,163,856 A | 12/2000 | Dion et al. |
| 6,173,359 B1 | 1/2001 | Carlson et al. |
| 6,195,730 B1 | 2/2001 | West |
| 6,225,709 B1 | 5/2001 | Nakajima |
| 6,247,096 B1 | 6/2001 | Fisher et al. |
| 6,260,110 B1 | 7/2001 | LeCrone et al. |
| 6,266,784 B1 | 7/2001 | Hsiao et al. |
| 6,269,423 B1 | 7/2001 | Kishi |
| 6,269,431 B1 | 7/2001 | Dunham |
| 6,282,609 B1 | 8/2001 | Carlson |
| 6,289,425 B1 | 9/2001 | Blendermann et al. |
| 6,292,889 B1 | 9/2001 | Fitzgerald et al. |
| 6,301,677 B1 | 10/2001 | Squibb |
| 6,304,880 B1 | 10/2001 | Kishi |
| 6,317,814 B1 | 11/2001 | Blendermann et al. |
| 6,324,497 B1 | 11/2001 | Yates et al. |
| 6,327,418 B1 | 12/2001 | Barton |
| 6,336,163 B1 | 1/2002 | Brewer et al. |
| 6,336,173 B1 | 1/2002 | Day et al. |
| 6,339,778 B1 | 1/2002 | Kishi |
| 6,341,329 B1 | 1/2002 | LeCrone et al. |
| 6,343,342 B1 | 1/2002 | Carlson |
| 6,353,837 B1 | 3/2002 | Blumenau |
| 6,360,232 B1 | 3/2002 | Brewer et al. |
| 6,389,503 B1 | 5/2002 | Georgis et al. |
| 6,408,359 B1 | 6/2002 | Ito et al. |
| 6,487,561 B1 | 11/2002 | Ofek et al. |
| 6,496,791 B1 | 12/2002 | Yates et al. |
| 6,499,026 B1 | 12/2002 | Rivette et al. |
| 6,557,073 B1 | 4/2003 | Fujiwara |
| 6,557,089 B1 | 4/2003 | Reed et al. |
| 6,578,120 B1 | 6/2003 | Crockett et al. |
| 6,615,365 B1 | 9/2003 | Jenevein et al. |
| 6,625,704 B2 | 9/2003 | Winokur |
| 6,654,912 B1 | 11/2003 | Viswanathan et al. |
| 6,658,435 B1 | 12/2003 | McCall |
| 6,694,447 B1 | 2/2004 | Leach et al. |
| 6,725,331 B1* | 4/2004 | Kedem .................. 711/117 |
| 6,766,520 B1 | 7/2004 | Rieschl et al. |
| 6,779,057 B2 | 8/2004 | Masters et al. |
| 6,779,058 B2 | 8/2004 | Kishi et al. |
| 6,779,081 B2 | 8/2004 | Arakawa et al. |
| 6,816,941 B1 | 11/2004 | Carlson et al. |
| 6,816,942 B2 | 11/2004 | Okada et al. |
| 6,834,324 B1 | 12/2004 | Wood |
| 6,850,964 B1 | 2/2005 | Brough et al. |
| 6,877,016 B1 | 4/2005 | Hart et al. |
| 6,915,397 B2 | 7/2005 | Lubbers et al. |
| 6,931,557 B2 | 8/2005 | Togawa |
| 6,950,263 B2 | 9/2005 | Suzuki et al. |
| 6,973,369 B2 | 12/2005 | Trimmer et al. |
| 6,973,534 B2 | 12/2005 | Dawson |
| 6,978,325 B2 | 12/2005 | Gibble |
| 7,032,126 B2 | 4/2006 | Zalewski et al. |
| 7,055,009 B2 | 5/2006 | Factor et al. |
| 7,072,910 B2 | 7/2006 | Kahn et al. |
| 7,096,331 B1 | 8/2006 | Haase et al. |
| 7,100,089 B1 | 8/2006 | Phelps |
| 7,111,136 B2 | 9/2006 | Yamagami |
| 7,127,388 B2 | 10/2006 | Yates et al. |
| 7,127,577 B2 | 10/2006 | Koning et al. |
| 7,152,077 B2 | 12/2006 | Veitch et al. |
| 7,155,586 B1 | 12/2006 | Wagner et al. |
| 2001/0047447 A1 | 11/2001 | Katsuda |
| 2002/0004835 A1 | 1/2002 | Yarbrough |
| 2002/0016827 A1* | 2/2002 | McCabe et al. ............. 709/213 |
| 2002/0026595 A1 | 2/2002 | Saitou et al. |
| 2002/0095557 A1 | 7/2002 | Constable et al. |
| 2002/0144057 A1 | 10/2002 | Li et al. |
| 2002/0163760 A1 | 11/2002 | Lindsay et al. |
| 2002/0166079 A1 | 11/2002 | Ulrich et al. |
| 2002/0199129 A1 | 12/2002 | Bohrer et al. |
| 2003/0004980 A1 | 1/2003 | Kishi et al. |
| 2003/0037211 A1 | 2/2003 | Winokur |
| 2003/0120476 A1 | 6/2003 | Yates et al. |
| 2003/0120676 A1 | 6/2003 | Holavanahalli et al. |
| 2003/0126388 A1 | 7/2003 | Yamagami |
| 2003/0135672 A1 | 7/2003 | Yip et al. |
| 2003/0149700 A1 | 8/2003 | Bolt |
| 2003/0182301 A1 | 9/2003 | Patterson et al. |
| 2003/0182350 A1 | 9/2003 | Dewey |
| 2003/0188208 A1 | 10/2003 | Fung |
| 2003/0217077 A1 | 11/2003 | Schwartz et al. |
| 2003/0225800 A1 | 12/2003 | Kavuri |
| 2004/0015731 A1 | 1/2004 | Chu et al. |
| 2004/0098244 A1 | 5/2004 | Dailey et al. |
| 2004/0181388 A1 | 9/2004 | Yip et al. |
| 2004/0181707 A1 | 9/2004 | Fujibayashi |
| 2005/0010529 A1 | 1/2005 | Zalewski et al. |
| 2005/0044162 A1 | 2/2005 | Liang et al. |
| 2005/0063374 A1 | 3/2005 | Rowan et al. |
| 2005/0065962 A1 | 3/2005 | Rowan et al. |
| 2005/0066118 A1 | 3/2005 | Perry et al. |
| 2005/0066222 A1 | 3/2005 | Rowan et al. |
| 2005/0066225 A1 | 3/2005 | Rowan et al. |
| 2005/0076070 A1 | 4/2005 | Mikami |
| 2005/0076261 A1 | 4/2005 | Rowan et al. |
| 2005/0076262 A1 | 4/2005 | Rowan et al. |
| 2005/0076264 A1 | 4/2005 | Rowan et al. |
| 2005/0144407 A1 | 6/2005 | Colgrove et al. |
| 2006/0047895 A1 | 3/2006 | Rowan et al. |
| 2006/0047902 A1 | 3/2006 | Passerini |
| 2006/0047903 A1 | 3/2006 | Passerini |
| 2006/0047905 A1 | 3/2006 | Matze et al. |
| 2006/0047925 A1 | 3/2006 | Perry et al. |
| 2006/0047989 A1 | 3/2006 | Delgado et al. |
| 2006/0047998 A1 | 3/2006 | Darcy |
| 2006/0047999 A1 | 3/2006 | Passerini et al. |

| | | |
|---|---|---|
| 2006/0143376 A1 | 6/2006 | Matze et al. |

FOREIGN PATENT DOCUMENTS

| | | |
|---|---|---|
| EP | 1 671 231 | 6/2006 |
| EP | 1 671231 | 6/2006 |
| WO | WO99/03098 | 1/1999 |
| WO | WO99/06912 | 2/1999 |
| WO | WO2005/031576 | 4/2005 |
| WO | WO2006/023990 | 3/2006 |
| WO | WO2006/023991 | 3/2006 |
| WO | WO2006/023992 | 3/2006 |
| WO | WO2006/023993 | 3/2006 |
| WO | WO2006/023994 | 3/2006 |
| WO | WO2006/023995 | 3/2006 |

OTHER PUBLICATIONS

"Alacritus Announces Disk-Based Successor to Tape" Knapp Comm., Aug. 21, 2002.
Biggar, Heidi, "Alacritus Enables Disk-Based Backup" InfoStor, Sep. 2001.
"Securitus I White Paper: Disk Based Data Protection from Alacritus Software" Alacritus Software, Inc., Jul. 2001.
"Alacritus Software FAQs" Alacritus Software, Inc., Jul. 2001.
"Disk-Based Data Protection" Alacritus Software, Inc., Jul. 2001.
"Virtual Tape Library Technology Brochure" Alacritus Software, Inc., Jul. 2001.
"Disk-Based Data Protection" Alacritus Software, Inc., Sep. 2001.
"Disk-Based Data Protection" Alacritus Software, Inc., Sep. 2002.
Payack, Paul JJ, "Alacritus Lines Up OEM Partners for Virtual Tape Library Push" The (451) Storage & Systems, Oct. 4, 2002.
Payack, Paul JJ, "Alacritus Software Announces Continuous Data Protection with New Chronospan Technology" Oct. 28, 2003.
Payack, Paul JJ, "Alacritus Software Announces New Customers for Securitus VTLA" Alacritus Software, Jan. 13, 2004.
Baltazar, Henry "Weaving Apps Into SAN Fabric" eWEEK, Mar. 24, 2003.
Baltazar, Henry "More Intelligence is on the Way" eWEEK, Sep. 15, 2003.
Barrett, Alex "The Case for Network Smarts" Storage Magazine, Jun. 2003.
"Securitus White Paper: Disk Based Data Protection from Alacritus Software" Alacritus Website, Oct. 2003.
"Manageability: Securitus v. Tape" Alacritus Website, Oct. 2003.
"The SNIA Data Management Forum Created to Tackle Data Protection and Information Lifecycle Management Issues: Enhanced Backup Solutions Initiative Rolls Efforts into New SNIA Forum" Storage Networking Industry Association, Oct. 13, 2003.
"No Changes Required: Securitus v. Tape" Alacritus Website, Oct. 2003.
"Customer Success" Alacritus Website, Oct. 2003.
"Chronospan" Alacritus Website, Oct. 2003.
"Alacritus Software Announces Securitus I, the Industry's First Virtual Tape Library Solution: Securitus I Heralds Advent of 'Disruptive Technology' that Serves as Replacement to Tape Libraries" Alcritus Software, Inc., Apr. 9, 2002.
Biggar, Heidi, "Disk and Tape Forge New Partnership in Backup Arena" InforStor, Nov. 2001.
Preston, W. Curtis, "Surprise! Cheap Disks Cure Slow Backup" Storage Magazine, Jun. 1, 2002.
"Alacritus, Hitachi CP and Nissho Team to Create Virtual Tape Library" internetnews.com, Jun. 25, 2001.
"Alacritus Software and Rhapsody Networks to Develop Breakthrough Backup Solutions for Storage Networks: Companies to Provide First Network-Intelligent Virtual Tape Solution Resulting in Dramatic ROI, Increases in Data Backup Performance and Scalability" Alacritus Software, Jul. 8, 2002.
Komiega, Kevin, "Vendor Pushes Disk Backup Over Tape" SearchStorage.com Jan. 10, 2003.
"Testimonials" Alacritus Website, Oct. 2003.
"Seamless Integration" Alacritus Website, Oct. 2003.
"Topologies" Alacritus Website, Oct. 7, 2003.
"Securitus" Alacritus Website, Oct. 2003.
"Scalability: Securitus v. Tape" Alacritus Website, Oct. 2003.
"Strengths: Securitus v. Tape" Alacritus Website, Oct. 2003.
"Alacritus Software's Securitus I: Pointing the Way to Virtual Tape Libraries" Aberdeen Group, Inc., Mar. 2002.
"Continuous Data Protection: Business Continuity for the Era of Networked Storage: An Executive White Paper" Aberdeen Group, Inc., Jul. 2003.
"Alacritus Software's Chronospan: Make Time for Continuous Data Protection" Aberdeen Group, Inc., Oct. 2003.
Hill, David "Alacritus Software's Securitus: Defining the Way to Virtual Tape Libraries" Aberdeen Group, Inc., Jul. 2003.
"Alacritus Software's Securitus: Defining the Way to Virtual Tape Libraries" Aberdeen Group, Inc., Jul. 2003.
"Product Brief: Rhapsody/Alacritus-Secritus/XPath Virtual Tape in the Fabric" The Enterprise Storage Group, Aug. 2002.
"Alacritus Software Announces Securitus I, The Industry's First Virtual Tape Library Solution: Securitus I Heralds Advent of 'Disruptive Technology' that Serves as Replacement to Tape Libraries" Alacritus Software, Inc., Jun. 25, 2001.
"Alacritus, Hitachi CP and Nissho Team to Create Virtual Tape Library Appliance: Industry's First Virtual Tape Library Appliance to Replace Storage Tape Libraries" Alacritus Software, Inc., Jun. 25, 2001.
"Hitachi CP, Nissho, and Alacritus Software Bring Virtual Tape Library Appliance Solution to Market: Three Companies Join to Deliver VTLA Smart Guard—A Disk Subsystem Product that Functions as a Virtual Storage Tape Library" Alacritus Software, Inc., Oct. 3, 2001.
Trimmer, Don, "Tape Free Backup/Recovery: Requirements and Advantages: Virtualization Technology Will Encompass Many Applications, One of the Most Significant Possibly Being Backup/Recovery" InfoStor, Mar. 2002.
"Alacritus Software Announces Virtual Tape Library Support for Legato NetWorker Data Protection Solution" Alacritus Software, Inc., Jan. 8, 2002.

* cited by examiner

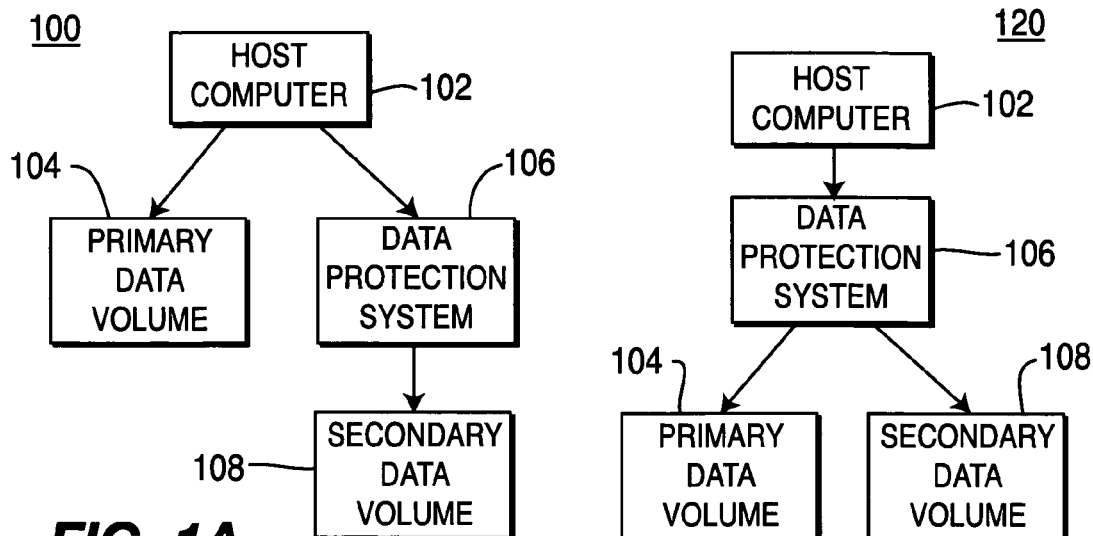
FIG. 1A
FIG. 1B
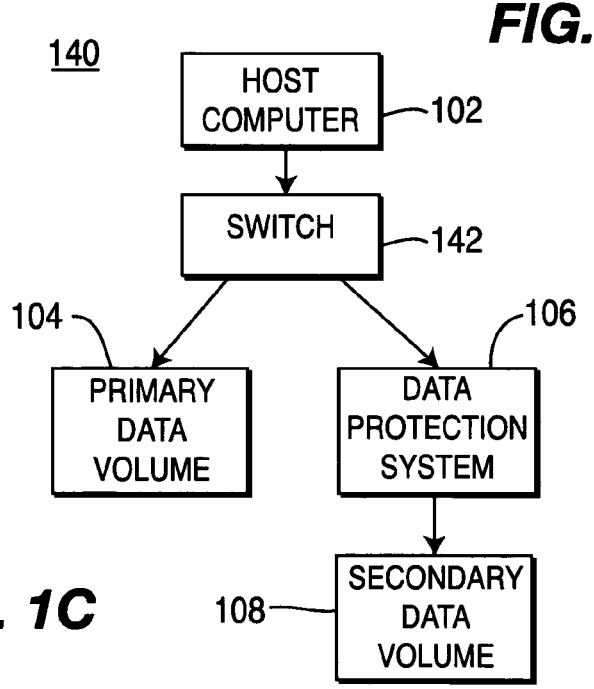
FIG. 1C
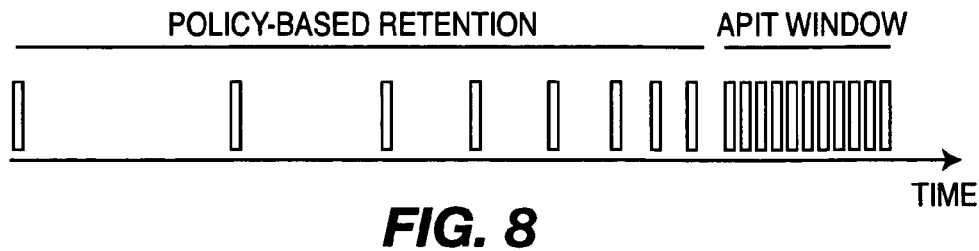
FIG. 8

METHOD AND SYSTEM FOR MAINTAINING DATA IN A CONTINUOUS DATA PROTECTION SYSTEM

CROSS REFERENCE TO RELATED APPLICATION(S)

This application claims priority from U.S. Provisional Application No. 60/541,626, entitled "METHOD AND SYSTEM FOR CONTINUOUS DATA PROTECTION," filed on Feb. 4, 2004; and U.S. Provisional Application No. 60/542,011, entitled "CONTINUOUS DATA PROTECTION IN A COMPUTER SYSTEM," filed on Feb. 5, 2004, both of which are incorporated by reference as if fully set forth herein.

FIELD OF THE INVENTION

The present invention relates generally to continuous data protection, and more particularly, to maintaining data in a continuous data protection system.

BACKGROUND

Data protection, used for backing up various types of data, from simple letters to mission-critical enterprise data, has typically been implemented by duplicating data via techniques such as mirroring with RAID (redundant array of independent disks). Mirroring relates to the physical media on which the data is stored, and protects against media failure. When a logical data loss or corruption occurs, such as an accidental file deletion or a virus, the data must be restored from a backup system.

Even when used in conjunction with mirroring, all of the disks in a RAID system reflect the current state of the primary disk; i.e., any data loss or corruption will also exist on the disks in the array. Backup copies are generally made on a periodic basis, and reflect the state of the primary disk at a given point in time. Because backups are not made on a continuous basis, when data is restored, there will be some data loss from the time of the backup until the time of the data loss. In a mission-critical setting, such a data loss, even if only for a brief period, can be catastrophic. Beyond the potential data loss, restoring a primary disk from a backup system, can become complicated and take several hours or more. This additional downtime further exacerbates the problems associated with a logical data loss.

The traditional process of backing up data to tape media and time driven and time dependent. A backup process typically is run at regular intervals and covers a certain period of time. For example, a full system backup may be run once a week on a weekend, and incremental backups may be run every weekday at some time after the close of business (usually overnight). These individual backups are then saved for a predetermined period of time, according to a retention policy. In order to conserve tape media and storage space, older backups are gradually faded out and replaced by newer backups. Further to the above example, after a full weekly backup is completed, the daily incremental backups for the preceding week may be discarded, and each weekly backup may be maintained for a few months, to be replaced by monthly backups.

While the backup creation process can be automated to a great extent, restoring data from a backup remains a manual and time-critical process. First, the appropriate backup tapes need to be located, including the latest full backup and any incremental backups made since the last full backup. In the event that only a partial restoration is required, locating the appropriate backup tape can take even longer. Then after the backup tapes are located, they must be restored to the primary disk. As can be imagined, even under the best of circumstances, this type of backup and restore process cannot guarantee high availability of data.

Another type of data protection involves making point in time (PIT) copies of data. A first type of PIT copy is a hardware-based PIT copy, which is a mirror of the primary disk onto a secondary disk. The main drawbacks to a hardware-based PIT copy are that the data ages quickly and that each copy takes up as much disk space as the primary disk. A software-based PIT, typically called a "snapshot," is a "picture" of a file system's data structure. Various types of software-based PITs exist, and most are tied to a particular platform, operating system, or file system. These snapshots also have drawbacks, including occupying space on the primary disk, rapid aging, and possible dependencies on data stored on the primary disk wherein data corruption on the primary disk leads to corruption of the snapshot. Furthermore, both types of PIT techniques still require the traditional tape-based backup and restore process.

Using a PIT copy means that a copy is made at a discrete moment in time, and restores based upon that PIT copy are based on that discrete moment in time. In contrast an any point in time (APIT) copy implies all moments in time, i.e., a continuous copy. It is therefore desirable to have a continuous data protection scheme in which a copy can be selected from any point in time.

SUMMARY

The present invention is a method and system where data is maintained in a continuous data protection system. A primary volume may be protected according to an any-point-in-time (APIT) window wherein restores may be performed at any time as desired. The APIT window may be of any time duration as desired. Outside of the APIT window, a retention policy for phasing out data may be established as desired.

BRIEF DESCRIPTION OF THE DRAWING(S)

A more detailed understanding of the invention may be had from the following description of a preferred embodiment, given by way of example, and to be understood in conjunction with the accompanying drawings wherein:

FIGS. 1A-1C are block diagrams showing a continuous data protection environment in accordance with the present invention;

FIG. 8 is a diagram illustrating the functionality provided by the present invention;

DETAILED DESCRIPTION OF THE PREFERRED EMBODIMENT(S)

Figure 2:
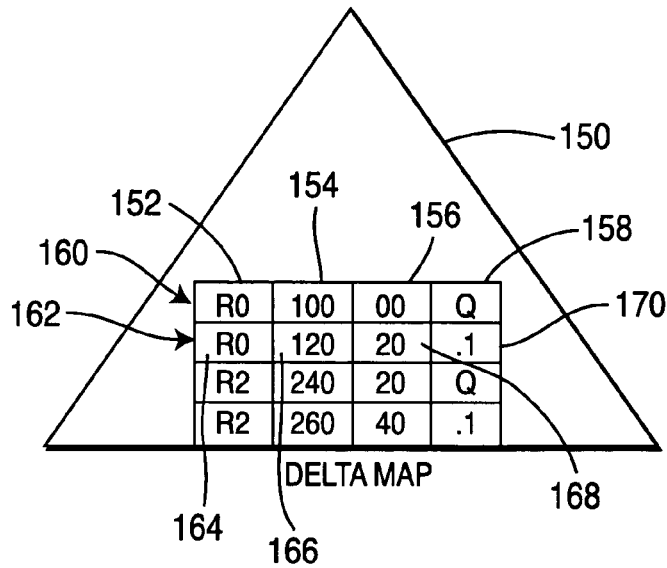
FIG. 2 is a delta map in accordance with the present invention.

In the present invention, data is backed up continuously, allowing system administrators to pause, rewind, and replay live enterprise data streams. This moves the traditional backup methodologies into a continuous background process in which policies automatically manage the lifecycle of many generations of restore images.

FIG. 1A shows a preferred embodiment of a protected computer system 100 constructed in accordance with the present invention. A host computer 102 is connected directly to a primary data volume 104 (the primary data volume may also be referred to as the protected volume) and to a data protection system 106. The data protection system 106 manages a secondary data volume 108. The construction of the system 100 minimizes the lag time by writing directly to the primary data volume 104 and permits the data protection system 106 to focus exclusively on managing the secondary data volume 108. The management of the volumes is preferably performed using a volume manager. The volume manager mirrors writes so that one copy goes to the primary volume 108 and one copy goes to the data protection system 106 which in turn writes sequentially to the secondary volume 108. That is, the data protection pretends to be a regular disk/volume but when writes arrive for a specific address, the system stores them sequentially on the secondary volume 108. A volume manager is software module that runs on a server or intelligent storage switch to manage storage resources. Typical volume managers have the ability to aggregate blocks from multiple different physical disks into one or more virtual volume. Applications are not aware that they are actually writing to segments of many different disks because one large, contiguous volume is presented to them. In addition to block aggregation, volume managers usually also offer software RAID functionality. For example, they are able to split the segments of the different volumes into two groups, where one group is a mirror of the other group. This is, in a preferred embodiment, the feature the present data protection system is taking advantage of when it is implemented as shown in FIG. 1A. In many environments, the volume manager or host-based driver already mirrors the writes to two distinct primary volumes for redundancy in case of a hardware failure. The present invention is configured as a tertiary mirror target in this scenario, such that the volume manager or host-based driver also send copies of all writes to the data protection system.

It is noted that the primary data volume 104 and the secondary data volume 108 can be any type of data storage, including, but not limited to, a single disk, a disk array (such as a RAID), or a storage area network (SAN). The main difference between the primary data volume 104 and the secondary data volume 108 lies in the structure of the data stored at each location, as will be explained in detail below. It is noted that there may also be differences in terms of the technologies that are used. The primary volume is typically an expensive, very fast, highly available storage subsystem, whereas the secondary volume is typically cost-effective, high capacity and comparatively slow (for example, ATA/SATA disks). Normally, the slower secondary volume cannot be used as a synchronous mirror to the high-performance primary volume. This is because the slow response time would have an adverse impact on the overall system performance. The disclosed data protection system, however, is optimized to keep up with high-performance primary volumes. These optimizations are described in more detail below. At a high level, random writes to the primary volume are processed sequentially on the secondary storage. Sequential writes improve both the cache behavior, as well as the actual volume performance of the secondary volume. In addition, it is possible to aggregate multiple sequential writes on the secondary volume, whereas this is not possible with the random writes to the primary volume. Also note that the present invention does not require writes to the data protection system to be synchronous. However, even in the case of an asynchronous mirror, minimizing latencies is important.

FIG. 1B shows an alternate embodiment of a protected computer system 120 constructed in accordance with the present invention. The host computer 102 is directly connected to the data protection system 106, which manages both the primary data volume 104 and the secondary data volume 108. The system 120 is likely slower than the system 100 described above, because the data protection system 106 must manage both the primary data volume 104 and the secondary data volume 108. This results in a higher latency for writes to the primary volume in the system 120 and lowers the available bandwidth for use. Additionally, the introduction of a new component into the primary data path is undesirable because of reliability concerns. Nonetheless, it is a usable configuration for lower-end deployments.

FIG. 1C shows another alternate embodiment of a protected computer system 140 constructed in accordance with the present invention. The host computer 102 is connected to an intelligent switch 142. The switch 142 is connected to the primary data volume 104 and the data protection system 106, which in turn manages the secondary data volume 108. The switch 142 includes the ability to host applications and contains some of the functionality of the data protection system 106 in hardware, to assist in reducing system latency and to improve bandwidth.

It is noted that the data protection system 106 operates in the same manner, regardless of the particular construction of the protected computer system 100, 120, 140. The major difference between these deployment options is the manner and place in which a copy of each write is obtained. To those skilled in the art it is evident that other embodiments, such as the cooperation between a switch platform and an external server, are also feasible.

In practice, certain applications require continuous data protection with a block-by-block granularity, for example, to rewind individual transactions. However, the period in which such fine granularity is required is, generally, relatively short (for example two days), which is why the system can be configured to fade out data over time. The present invention discloses data structures and methods to manage this process automatically.

Because data is continuously backed-up in the present invention, reversing each write to get to a particular point in time quickly becomes unfeasible where hundreds, thousands or more writes are logged every second. The amount of data simply becomes too large to scan in a linear fashion. The present invention therefore provides data structures (i.e. delta maps) so that such voluminous amounts of backup data may be efficiently tracked and accessed, as desired.

In typical recovery scenarios, it is necessary to examine how the primary volume looked like at multiple points in time before deciding which point to recover to. For example, consider a system that was infected by a virus. In order to recover from this virus, it is necessary to examine the primary volume as it was at different points in time in order to find the latest recovery point where the system was not yet infected by the virus. In order to efficiently compare multiple potential recovery points, additional data structures are needed. Delta maps provide a mechanism to efficiently recover the primary volume as it was at a particular point in time, without the need to replay the write log in its entirety, one write at a time. In particular, delta maps are data structures that keep track of data changes between two points in time. These data structures can then be used to selectively play back portions of the write log such that the resulting point-in-time image is the same as if the log were played back one write at a time, starting at the beginning of the log.

Referring now to FIG. 2, there is shown a delta map 150 in accordance with the present invention. While the format shown in FIG. 2 is preferred, any format may of course be used. For each write to a primary volume, a duplicate write is made, in sequential order, to a secondary volume. To create a mapping between the two volumes, it is preferable to have an originating entry and a terminating entry for each write. The originating entry includes information regarding the origination of a write. The terminating entry includes information regarding the termination of a write. For example, as shown in delta map 150, row 160 is an originating entry and row 162 is a terminating entry. Row 160 includes a field 152 for specifying the region of a primary volume wherein the first block was written to; a field 154 for specifying the block offset within that region; a field 156 for specifying where on the secondary volume the duplicate write (i.e. the copy of the primary volume write) begins; and a field 158 for specifying the physical device used to make the write persistent. Row 162 includes a field 164 for specifying the region of the primary volume wherein the last block was written to; a field 166 for specifying the block offset in a region of a primary volume at which the write ends; and a field 168 for specifying where on the secondary volume the duplicate write ends or alternatively, where the next write starts. While field 170 is provided in a terminating entry such as row 162, it is noted that such a field 170 is not necessary since there is no physical device usage associated with termination of a write. Also note that rows 160 and 162 follow the same format in this implementation. In other words, the terminating entry conforms to the same notation as the initiating entry. This is intentional because if a new block were written consecutive to the first block, the initiating entry of the second block would also be the terminating entry for the first block, thus guaranteeing a very compact and space efficient notation.

In a preferred embodiment, as explained above, each delta map contains a list of all blocks that were changed during the particular time period to which the delta map corresponds. That is, each delta map specifies a block region on the primary volume, the offset on the primary volume, and physical device information. This information can then be used to recreate the primary volume as it looked like at a previous point in time. For example, assume that a volume was brand new and that only the two writes in delta map 150 have been committed to it. The map thus contains a list of all modifications since the volume was in its original state. In order to recreate the volume as it was after these two writes (for example, after a failure of the primary volume), the system examines the first two entries in the delta map. These entries are sufficient to determine that a block of data had been written to region R0 on the primary disk at offset 100 and that the length of this write was 20. In addition, fields 156 and 158 can be used to determine where the duplicate copy was written on the secondary volume. This process can then be repeated for each entry and an exact copy of the primary volume at that time can be recreated in this fashion. It is noted that other fields or a completely different mapping format may be used while still achieving the same functionality. For example, instead of dividing the primary volume into block regions, a bitmap could be kept, representing every block on the primary volume.

Figure 3:
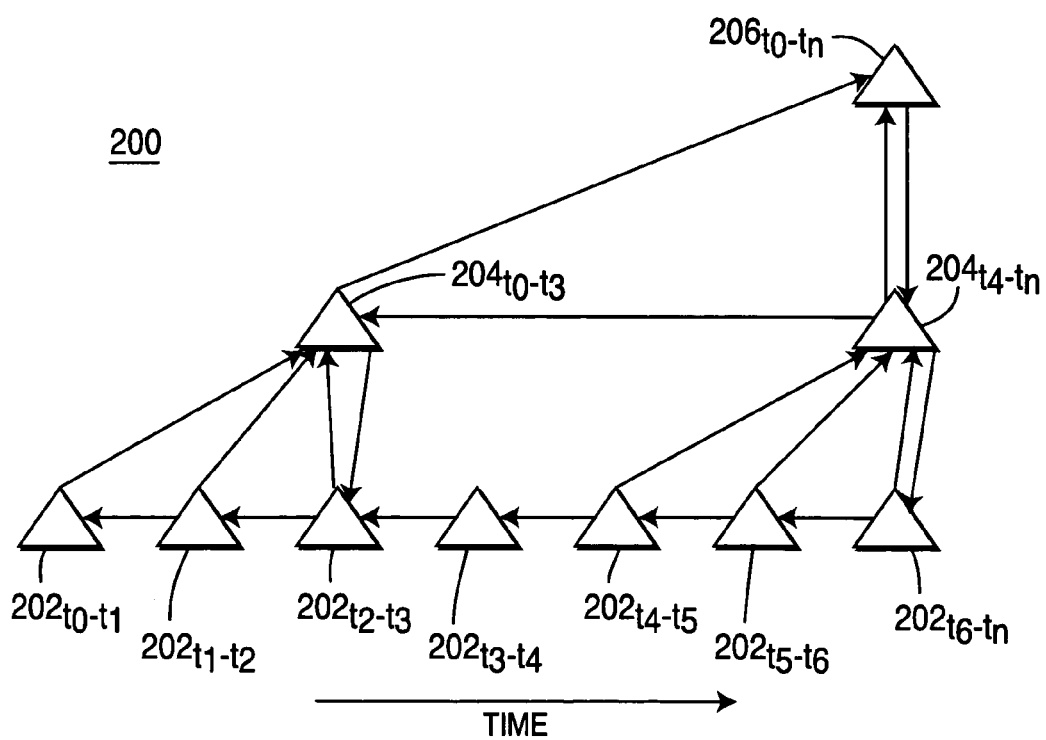
FIG. 3 is a hierarchy of delta maps for storing data in a continuous data protection system.

Referring now to FIG. 3, there is shown a hierarchy 200 of delta maps for storing data in a continuous data protection system. Delta maps 202 are initially created from the write log, using a map engine. This could occur in real-time or after a certain number of writes or according to a time interval, etc. Additional delta maps may also be created as a result of a merge process. Such maps are referred to as merged delta maps 204 and 206 and may be created to optimize the access and restore process. The delta maps 202 are stored on the secondary volume and contain a mapping of the primary address space to the secondary address space. The mapping is kept in sorted order based on the primary address space as illustrated in FIG. 2.

As explained above, each delta map includes information necessary to recreate the changes to the protected volume for a particular time window. For example, delta map $202_{t0-t1}$ corresponds to the change of the protected volume between time zero and time one, delta map $202_{t1-t2}$ corresponds to the change of the protected volume from time one to time two, and so forth. It is noted that these time windows do not necessarily need to be of equal size. If a primary volume is completely destroyed at time n+1, a full restore as of time n may be performed by simply using merged delta map $206_{t0-tn}$. If a loss occurs at time three, and the primary volume needs to be restored, merged delta map $202_{t0-t3}$ may be used. If a loss occurs at time five and the system needs to be restored to time four, merged delta map $204_{t0-t3}$ and delta map $204_{t3-t4}$ may be used.

As shown in FIG. 3, the delta maps are chained together in chronological order. In the preferred embodiment, each delta map points to the previous delta map, a merged delta map if it exists, and, in the case of a pre-merged delta map, to the first child delta map. Other embodiments are possible, for example, where both forward and backward pointers are kept or only forward pointers are kept. The protected volume may therefore be restored using any delta map or pre-merged delta map as desired. In FIG. 3, three levels of pre-merging are implemented. However, it is possible to create a hierarchy of fewer or more levels, as desired.

Figure 4:
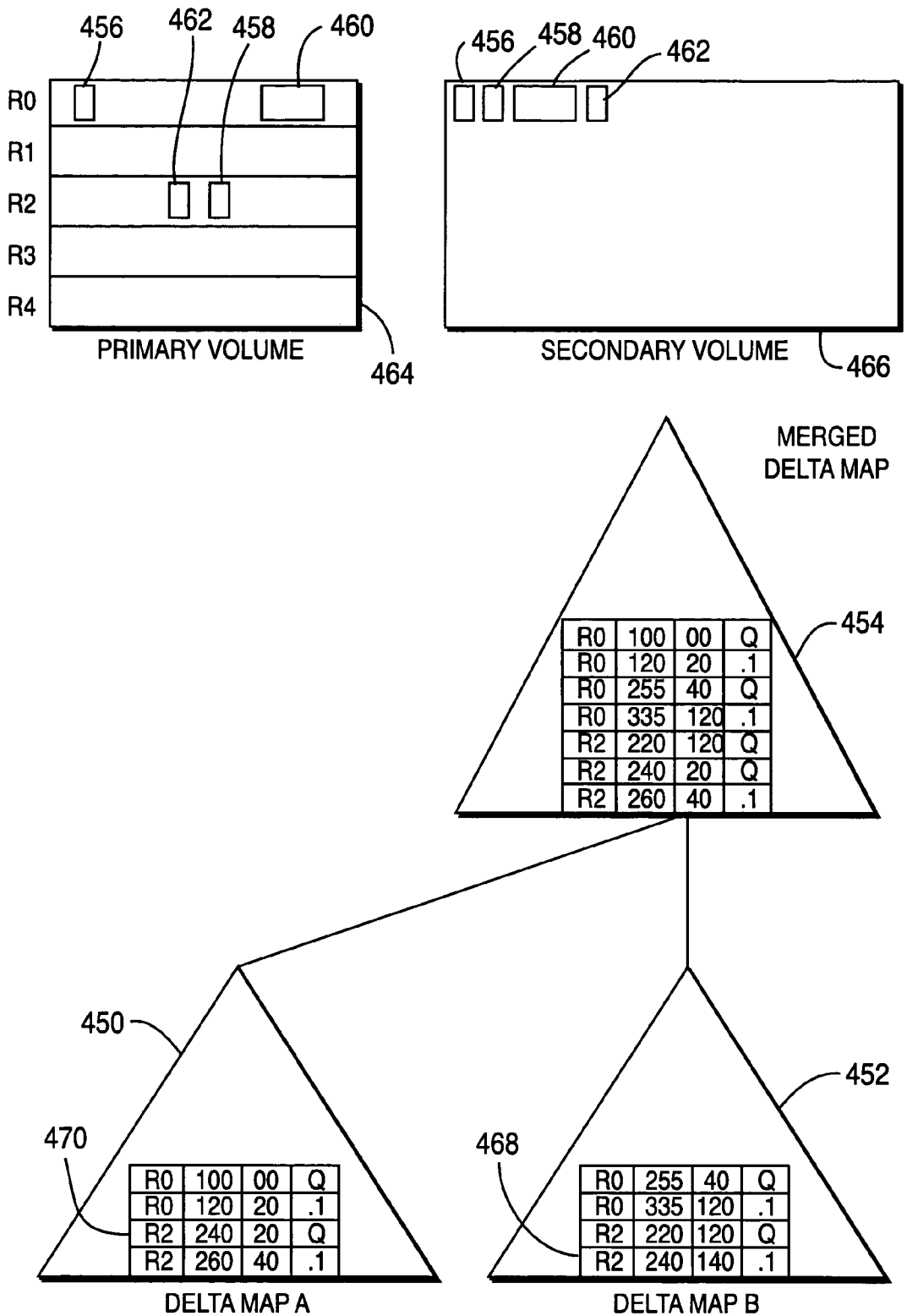
FIG. 4 illustrates how delta maps are merged and how they are used to rewind a system to a previous point in time.

Referring now to FIG. 4, two delta maps 450 and 452 and a merged delta map 454 are shown. In FIG. 4, four writes 456, 458, 460, 462 have been written to a primary volume 464. Increasing reference numerals are used to denote the point in time at which each write occurred. That is, write 456 was before write 458 and so forth. As can be seen from comparing the primary and secondary volumes 464, 466, each write made to the primary volume 464 is duplicated in sequential fashion to the secondary volume 466. Duplicating the writes in sequential fashion allows the order in which writes occurred on the primary volume to be readily apparent from the layout of the secondary volume. Conversely, the original location is not apparent and needs to be stored in the delta maps, as discussed. This example illustrates the difference between block-order and time-order.

Delta map 450 includes the originating and terminating entries for writes 456 and 458 while delta map 452 includes originating and terminating entries for writes 460 and 462. In delta map 450, the two top entries are the originating and terminating entries for write 456 and the two bottom entries are the originating and terminating entries for write 458. Similarly, the two top entries in delta map 452 are the originating and terminating entries for write 460 and the two bottom entries are the originating and terminating entries for write 462. As explained above, the delta maps 450 and 452 include the specifics regarding each write that occurred during the time period covered by the particular delta map.

Delta maps 450 and 452 may be merged into a single merged map 454. One significant benefit of merging delta maps is a reduction in the number of entries that are required. Another, even more significant benefit, is a reduction in the number of blocks that need to be kept on the secondary volume once the lower-level maps are expired. It is noted, however, that this is only the case when a previous block was overwritten by a newer one. For example, in this particular scenario, it is possible to eliminate the terminating entry 468 of write 462 because writes 462 and 458 are adjacent to each other on the primary volume. That is, because there is a terminating entry 468 with the same offset (i.e. 240) as an originating offset 470, the terminating entry 468 may be eliminated in merged delta map 454. By way of further example, if a subsequent write was performed that entirely filled region two (i.e. R2), and the map containing that write was merged with map 454, all of the entries related to R2 would be replaced with the R2 originating and terminating entries for the subsequent write. In this case, it will also be possible to free up the blocks in this region once the delta maps are expired. The delta maps and the structures created by merging maps reduces the amount of overhead in maintaining the mapping between the primary and secondary volumes over time.

Figure 5:
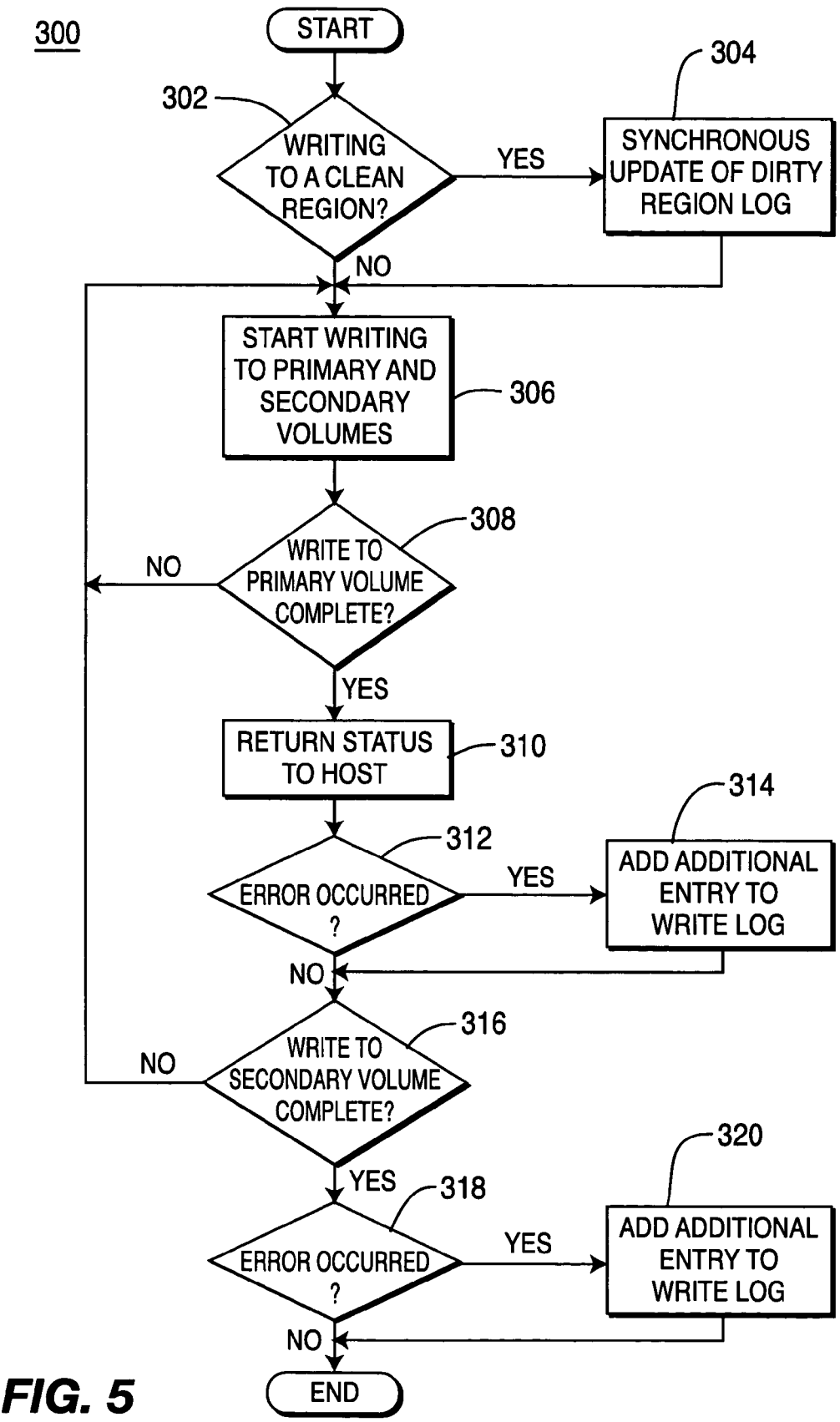
FIG. 5 is a method wherein data is written to a continuous data protection system.

Referring now to FIG. 5, there is shown a method wherein data is written to a continuous data protection system. In this implementation, the primary and secondary storage are managed by the same software, which could either be a host-based driver/software or a switch/appliance. First, it is determined in step 302 whether the system is writing to a clean region. If yes, the dirty region log is updated in step 304 and the system writes to the primary and secondary volumes in step 306. If no, the method 300 proceeds directly from step 302 to step 306.

If writing to the primary volume is complete (step 308), the method proceeds to step 310 wherein the status (i.e., an indication that the primary volume write is complete) is sent to the host. It is important to note that a "good" status can be returned without regard to whether the data made it to the secondary volume in this embodiment. This is advantageous for performance reasons. However, a synchronous embodiment is also possible as described above. The method 300 then proceeds to step 312 to check for errors in the primary volume write. If an error has occurred, an additional entry is added to the write log in step 314 reflecting the fact that an error has occurred and then the method 300 proceeds to step 316. If no error has occurred, the method 300 proceeds directly from step 312 to step 316. In step 316, it is confirmed whether writing to the secondary volume is complete. Once the write is completed, the method 300 proceeds to step 318 to check for errors in the secondary volume write. If an error has occurred, an entry reflecting the fact that an error has occurred is added to the write log (step 320).

Figure 6:
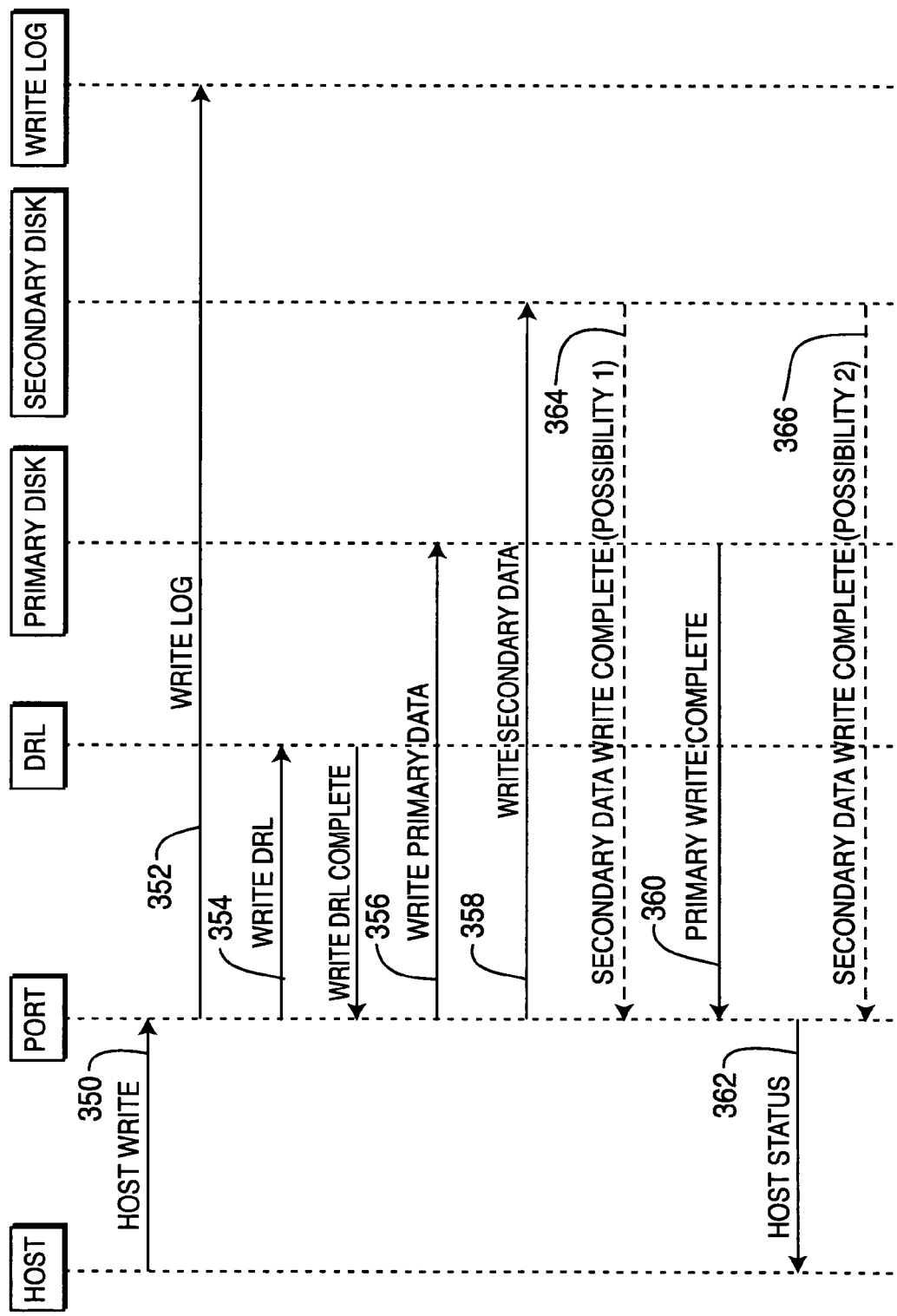
FIG. 6 is a flow diagram illustrating the steps involved when a write is made by a primary volume.

By way of further explanation, the sequence of events performed when a host computer performs a write to a primary volume is shown in FIG. 6. When a host performs a write 350, an entry is added to a write log buffer 352. It is noted that if the write log buffer is full, it is asynchronously flushed. When a write log buffer is flushed, the writes are written out to a secondary volume. That is, duplicated writes may be kept in a buffer and written to the secondary volume whenever the buffer gets full or at another convenient time. Non-volatile RAM can be used to increase this buffer safely.

If the write is to a clean region, a synchronous update of the dirty region log (DRL) is performed 354. Then, both the primary and secondary writes are started 356, 358. Once the primary write is completed 360, the status is returned to the host 362. If a host-based volume manager is used, this happens independently of the secondary write. If an error occurred in the primary write, it is indicated in the write log by adding an additional entry. Of course, there are two possibilities with respect to the completion of the secondary write (i.e. the duplicate write made to a secondary volume). That is, the secondary write may be completed before 364 or after 366 the completion of the primary write 360. It is noted that whether the secondary write is completed before 364 or after 366 does not affect implementation of the present invention. As with completion of the primary write, if an error occurred in the secondary write, it is indicated in a write log by adding an additional entry to the write log.

Figure 7:
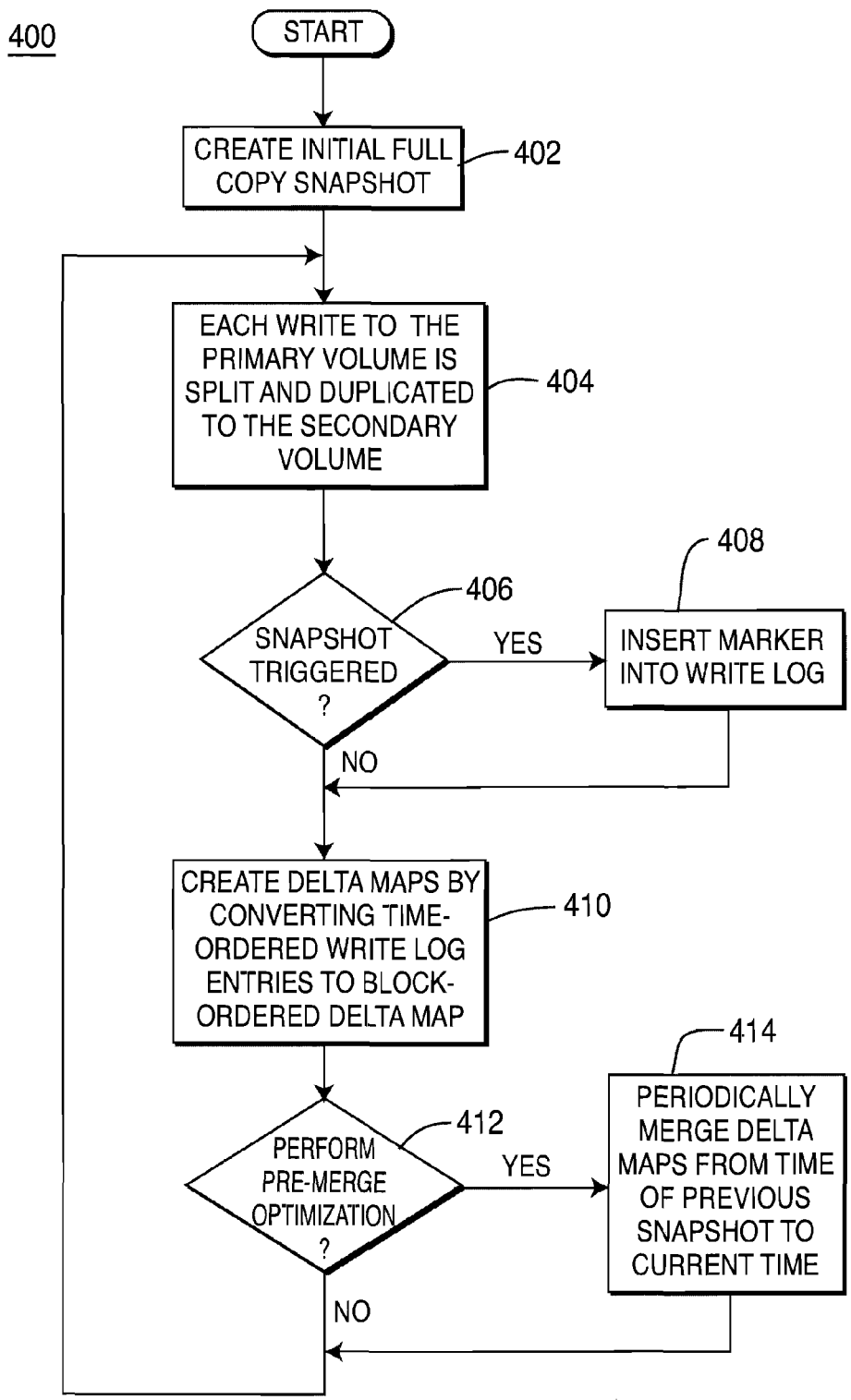
FIG. 7 is an overview of the operation of the complete data protection system.

Referring now to FIG. 7, the data protection system preferably operates according to method 400. The method 400 begins with step 402 wherein an initial full copy snapshot is created. The initial snapshot is the first snapshot taken of the data existing on the primary volume.

By way of explanation, assuming the present invention is implemented to protect a system that is currently in production. Such a system already contains important data on the primary volume at time t0. Hence, if the system starts recording the changes from this point on, the volume cannot be reconstructed at a later time unless there is a copy of the volume as it was at time t0. The initial full copy does exactly this—it initializes the secondary volume to a state where the contents of each block at time t0 are known. It is noted that in the special case when the primary volume is empty or will be formatted anyway, users have the option to disable the initial full copy. This means, however, that if they want to restore the volume back to time t0, an empty volume will be presented. To provide further explanation, assume that the primary volume already contains important data. In that case, if blocks 5, 9, and 57 are overwritten at times t1, t2, and t3 respectively, it is not possible to present a complete volume image as it was at time t2. This is because it is not known what blocks 1, 2, 3, 4, 6, 7, 8, 10, 11, etc. looked like at that time without having taken a full copy snapshot first.

Referring again to FIG. 7, the initial snapshot establishes time zero for the secondary volume, as explained above. Once the state of the primary volume at time zero is established, each write to the primary volume is split and duplicated to the secondary volume (step 404). In step 406, it is determined whether a snapshot is triggered. If so, a marker is inserted into the secondary volume write log in step 408 and then the method proceeds to step 410. A snapshot in this context is simply a point in time to which the system can recover to at a later time. Delta maps are kept for that point in time until the snapshot expires. Note that because all data has already been stored in the write log, no data movement is necessary to take a snapshot. If no snapshot is taken, the method 400 proceeds directly to step 410.

In step 410, a delta map is created by converting the time-ordered write log entries to a block-ordered delta map. Next, in step 412, it is determined whether pre-merge optimization will be performed. If so, delta maps are periodically merged to provide a greater granularity in the data on the secondary volume (step 414). It is noted that merging of delta maps can occur at any time and according to any desired policy. In the preferred embodiment, the merging algorithm looks for adjacent delta maps with the same expiration policy and merges those. This minimizes the number of merge operations that will be required upon expiration. In a different embodiment, pre-merging occurs automatically after a certain number of writes W or after a certain time period T. Additionally, the system is capable of storing full maps of the primary volume at various points in time. This significantly accelerates the merging process later because fewer maps need to be merged. Regardless of whether pre-merge optimization is performed (step 412), the method 400 cycles back to step 404.

Referring now to FIG. 8, the present invention enables a restore to be performed at any point in time. That is, as explained in the background section, the ideal situation when backing up data is to record every single write so that the writes may be rewound to any point in time as needed in the event of a loss. That is, if data is recorded from time 0 to time 10 and a loss occurs at time 4, simply rewind the backup data, take a snapshot at time 3, and restore the system as of time 3. As mentioned, this is ideal. The period of time in which complete freedom to rewind backup data to any point in time to take a snapshot and perform a restore is referred to as a any-point-in-time (APIT) window. In most applications, although easily done with the teachings of the present invention, this degree of granularity in the ability to perform a restore is not required. Therefore, as shown in FIG. 8, an APIT window is provided wherein no data is phased out (i.e. no delta maps are deleted although delta maps may be or have been merged). For example, referring again to FIG. 3, if time 0 to time 6 was within an APIT window, none of the bottom row of delta maps would be deleted or otherwise phased out. Once outside the APIT window, which is set purely according to operator preference, data may be phased out as desired. The combination of being able to provide an APIT window as well as a period of time outside of the APIT window where data may be phased out provides complete control and functionality with respect to the timing of backups and the taking of snapshots to perform restores. That is, implementing the teachings of the present invention enables operators to use the present invention to simulate their current backup system while providing the ease of backing up to disk and having the option of implementing an APIT window if needed. Alternatively, the present invention enables operators the ability to provide an APIT window wherein data outside the window is simply discarded and the system may be restored to APIT as needed. For example, where you learn a loss has occurred at a particular time, simply go whatever time you want to restore the system to, take a snapshot, and perform the restore. Of course, you may also have any combination of these features, as desired.

Whenever a snapshot is triggered, a PIT map is created (FIG. 7, step 406). A PIT map is a completed mapping between the primary volume and secondary volume at the time of the snapshot. When a particular snapshot is selected, the delta map referencing that particular point in time is selected and all of the delta maps before that time are merged together to create the entire PIT map. If the PIT map falls within an APIT window, the closest delta map before this point in time is used and is merged with all the previous delta maps along with the entries between the delta map and the point at which the snapshot was taken, if needed.

The creation of a PIT map can be performed dynamically, providing access to the snapshot immediately. In the case when an access to data is in a region of the PIT map that has not yet been fully resolved (merged), the delta map merging is performed immediately for that region. PIT maps may be stored persistently or retained as temporary objects and the volumes that are presented on the basis of these PIT maps are preferably read/writeable. When PIT maps are stored as temporary objects, new writes are stored in a temporary area such that the previous point in time can be recreated again without the new writes. However, as explained above, these temporary writes may be retained for the long term. When PIT maps are stored persistently, information about a PIT map including the disk location, where the map is stored, and the point in time of the PIT map are also made persistent. In this case, in the event of a restart, any task that was active for a PIT map will be restarted by the map manager.

It is noted that snapshots may be taken and thus corresponding PIT maps created simply to improve system performance. When merging maps, it is never necessary to return further back than the most recent PIT map because by definition the PIT map includes mapping information for every block on disk at whatever time the PIT map was created. For example, referring again to FIG. 3, where a PIT map was created subsequent to time 0, any restore would only require delta maps back to the PIT map. While performance optimizing PIT maps may be retained, regular PIT maps (PIT maps created to perform an actual restore) do not need to be retained long term, particularly if the space requirements are too great.

Figures 9, 10:
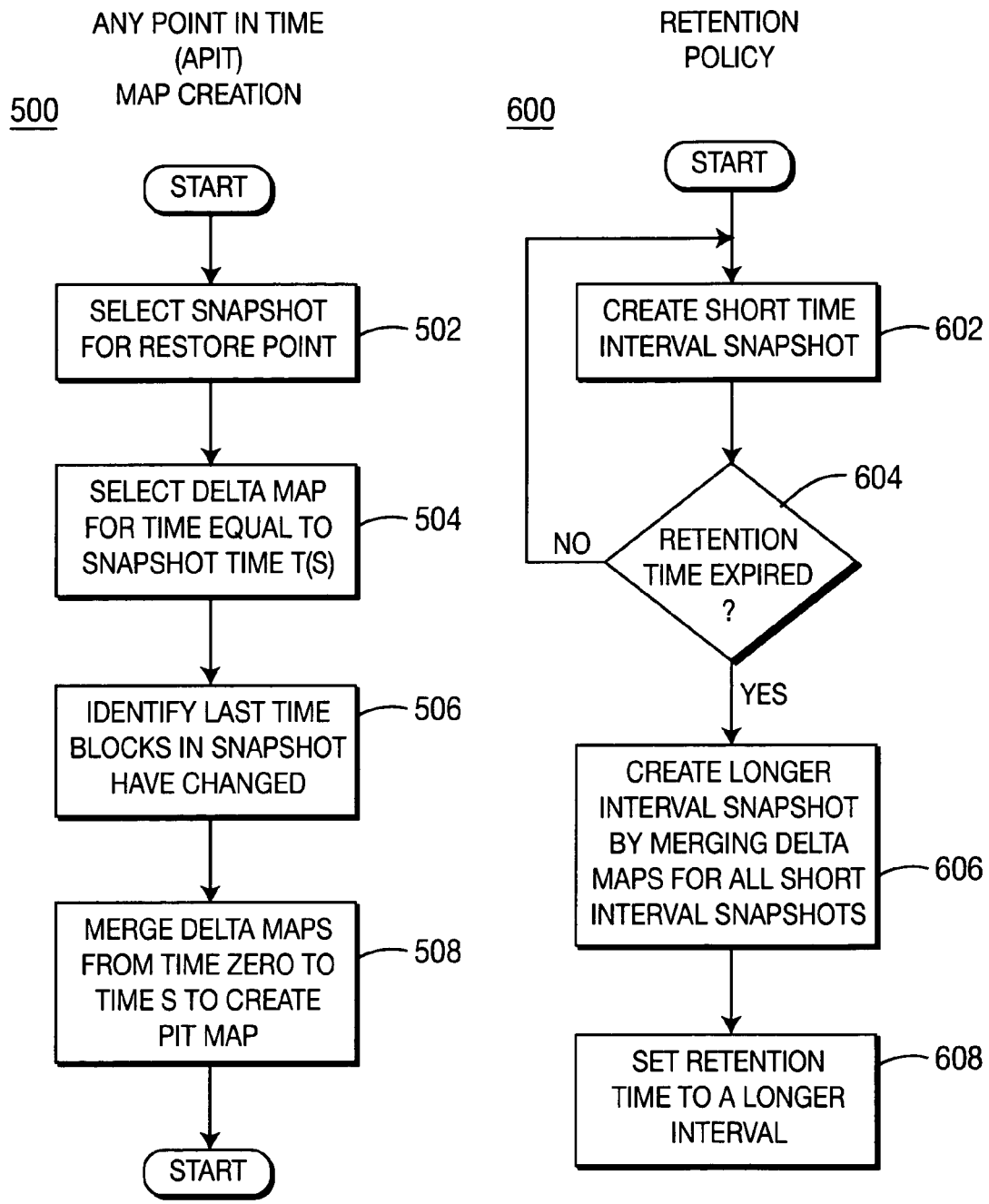
FIG. 9 is a method for creating point-in-time (PIT) maps for enabling data saved continuously on a protected volume to be maintained according to a predetermined retention policy.
FIG. 10 is a method for implementing a retention policy in a continuous data protection system.

Referring now to FIG. 9, there is shown a method 500 for creating point-in-time (PIT) maps for enabling data saved continuously on a protected volume to be maintained according to a predetermined retention policy. The method 500 begins with step 502 with selecting a snapshot for the restore point. As described above, snapshots are taken at predetermined intervals. The various snapshots capture the state of the data as of the time of the snapshot. The snapshot that is chosen is the point in history at which the user wishes to restore the data. In other words if the primary disks fails at a particular date, the system administrator will typically want to restore the system as of that date. The administrator will therefore select a snapshot corresponding to that date for the restore point.

Once the snapshot is selected, the delta map corresponding to the time of the snapshot (i.e. t(s)), is selected in step 504. To minimize the number of delta maps that need to be merged in order to create the PIT map, it is preferable to identify the last time blocks in the snapshot have changed (step 506). Then, in step 508, the delta maps from time zero (i.e. t(0)) to t(s) are merged to create a PIT map. The PIT map may then be used as desired to restore the primary system to its state as of t(s). Of course, where a PIT map exists that was taken prior to the time at which the snapshot was taken, the maps between that PIT map and the snapshot may simply be merged and not all of the maps back to time 0.

It is noted that outside the APIT window, some data will get phased out. Deciding which data to phase out is similar to a typical tape rotation scheme. That is, a policy is entered by the administrator that decides to keep data that was recorded, for example at each minute boundary. It is also noted that the present invention provides versioning capabilities with respect to snapshots (i.e. file catalogues, scheduling capabilities, etc.) as well as the ability to establish compound/aggregate policies, etc. when outside an APIT window.

Referring now to FIG. 10, there is shown a method 600 for implementing a retention policy outside of an APIT window in a continuous data protection system. The method 600 begins in step 602 with creating a snapshot. A short-time interval snapshot is one of many snapshots taken at predetermined intervals so to provide a desired level of granularity in the data stored in the secondary volume. Typically the predetermined intervals are set such that there is a high level of granularity (i.e. many snapshots from which to create PIT maps for purposes of a restore) in the secondary volume. The short-time interval snapshots are typically used where the data is still relatively fresh and it is likely that changes in the primary volume that occurred between small intervals of time may be needed in the event of a failure.

The older the data is, however, the less likely it is that snapshots between small time intervals will be needed. That is, the older the data, the less granularity that is required in the secondary volume. Therefore, in step 604, it is determined whether the retention time has expired for any of the data. If no, the method 600 cycles back to step 602 where additional short-time-interval snapshots are created. If yes (i.e. the retention time for the snapshot has expired), longer interval snapshots may be created by merging delta maps for all short-interval snapshots (step 606). From step 606, the method 600 proceeds to step 608 where the retention time is set to a longer interval.

Although the present invention has been described in detail, it is to be understood that the invention is not limited thereto, and that various changes can be made therein without departing from the spirit and scope of the invention, which is defined by the attached claims.

What is claimed is:

1. A method for providing continuous data protection, the method comprising the steps of:
   writing data to a primary volume;
   duplicating the writes made to the primary volume to a second volume in a sequential fashion, wherein the secondary volume contains a chronological ordering of all writes made to the primary volume; and
   identifying any point in time (APTI) window wherein all writes to the secondary volume are maintained so that within the identified APIT window, the primary volume may be restored to any previous point within the APIT window;
   creating a block-ordered mapping data structure to track changes in the data written to the secondary volume between two points in time; and
   merging the mapping data structures that protect contiguous points in time, whereby fewer mapping data structures are needed to protect the data between the same two points in time spanning the merged mapping data structures.

2. The method of claim 1 further including the step of retaining particular points in time beyond the APIT window.

3. The method of claim 2 wherein a point-in-time map is created by creating a full mapping between the primary volume and the secondary volume for a point in time that is retained beyond the APIT window, the full mapping using a data structure.

4. The method of claim 3 wherein the full mapping is created by merging data structures ranging in time from an initial time to a time when a snapshot was taken.

5. The method of claim 3 wherein the full mapping is created by merging data structures ranging in time from a time a point-in-time map created prior to a snapshot was taken to a time when the snapshot was taken.

6. The method of claim 1 wherein data on the secondary volume that is outside of the identified APIT window is discarded.

7. The method of claim 1 wherein data on the secondary volume that is outside of the identified APIT window is phased out according to a retention policy.

8. The method of claim 3 further comprising the step of periodically creating point-in-time maps to reduce a number of data structures that are needed when performing a restore.

9. A method for operating a data protection system for a protected computer system, the method comprising the steps of:
   tracking writes made to a primary volume;
   duplicating the writes to the primary volume in a sequential fashion on a secondary volume, wherein the secondary volume contains a chronological ordering of all writes made to the primary volume;
   organizing a mapping of the writes between the primary volume and the secondary volume into block-ordered data structures, wherein the data structures enable the primary volume to be restored at any point in time;
   identifying any point in time window wherein the data structures are maintained so that within the identified time window, the primary volume may be restored at any point within the time window; and
   merging the data structures that protect contiguous points in time, whereby fewer data structures are needed to protect the data between the same two points in time spanning the merged data structures.

10. The method of claim 9 wherein a snapshot is taken at a particular point in time within the identified time window and a full mapping of the primary volume and the secondary volume for the particular point time is created.

11. The method of claim 10 wherein the full mapping is created by merging data structures ranging in time from an initial time to a time when the snapshot was taken.

12. The method of claim 10 wherein the full mapping is created by merging data structures ranging in time from a time when a point-in-time map created prior to the snapshot was taken to the time the snapshot was taken.

13. A system for providing continuous data protection, the system comprising:
   a host computer;
   a primary volume for storing data written by the host computer;
   a secondary volume wherein writes made to the primary volume are sequentially duplicated onto the secondary volume, the secondary volume containing a chronological ordering of all writes made to the primary volume; and
   a data protection system configured to:
   manage the duplication of writes to the secondary volume;
   map data between the primary volume and the secondary volume using block-ordered data structures, wherein the data structures are maintained so that within an established time window, the primary volume may be restored to any point within the time window; and
   merge the data structures that protect contiguous points in time, whereby fewer data structures are needed to protect the data between the same two points in time spanning the merged data structures.

14. The system of claim 13 wherein the data protection system is configured to create a point-in-time map for a point-in-time at which the primary volume needs to be restored.

15. The system of claim 14 wherein the point-in-time map is created by creating a full mapping between the primary volume and the secondary volume.

16. The system of claim 15 wherein the full mapping is created by merging data structures ranging in time from an initial time to a time when a snapshot was taken.

17. The system of claim 16 wherein the full mapping is created by merging data structures ranging in time from a time when a point-in-time map created prior to the snapshot was taken to the time the snapshot was taken.

18. A computer-readable storage medium containing a set of instructions for a general purpose computer, the set of instructions comprising:
- a tracking code segment for tracking writes made to a primary volume;
- a duplicating code segment for duplicating the writes to the primary volume in a sequential fashion on a secondary volume, wherein the secondary volume contains a chronological ordering of all writes made to the primary volume;
- an organizing code segment for organizing a mapping of the writes between the primary volume and the secondary volume into block-ordered data structures, wherein the data structures enable the primary volume to be restored to any point in time;
- an identifying code segment for identifying any point in time window wherein the data structures are maintained so that within the identified time window, the primary volume may be restored to any point within the time window; and
- a merging code segment for merging the data structures that protect contiguous points in time, whereby fewer data structures are needed to protect the data between the same two points in time spanning the merged data structures.

19. A method for enabling data recovery from a primary volume in a contiguous data protection system, comprising the steps of:
- creating an initial copy of the primary volume;
- after the initial copy is made, duplicating each write to the primary volume to a write log to be stored on a secondary volume, the write log being written to the secondary volume when the write log is full, wherein the secondary volume contains a chronological ordering of all writes made to the primary volume;
- creating a snapshot of the primary volume, the snapshot being a point in time to which the primary volume can be stored;
- creating a block-ordered data structure to track the writes made to the secondary volume, the data structure being derived from the write log and containing the writes made to the primary volume between two points in time; and
- merging the data structures that protect contiguous points in time, whereby fewer data structures are needed to protect the data between the same two points in time spanning the merged data structures.

20. The method according to claim 19, wherein creating the snapshot includes inserting a marker into the write log, the marker indicating a time at which the snapshot is taken.

21. The method according to claim 19, wherein the merging step includes
- merging data structures from a time corresponding to a snapshot to a current time.

22. A method for providing continuous data protection, comprising the steps of:
- writing data to a primary volume;
- duplicating the writes made to the primary volume to a secondary volume in a sequential fashion, wherein the secondary volume contains a time-based ordering of all writes made to the primary volume;
- identifying an any point in time (APIT) window wherein all writes to the secondary volume are maintained so that within the identified APIT window, the primary volume may be restored to any point within the APIT window;
- mapping the writes between the primary volume and secondary volume using a data structure; and
- merging data structures that protect contiguous points in time, whereby fewer data structures are needed to protect the data between the same two points in time spanning the merged data structures.

23. The method of claim 22, further comprising the step of retaining particular points in time beyond the APIT window.

24. The method of claim 23, wherein a point in time map is created by creating a full mapping between the primary volume and the secondary volume for a point in time that is retained beyond the APIT window, the full mapping using a data structure.

25. The method of claim 24, wherein the full mapping is created by merging data structures ranging in time from an initial time to a time when a snapshot was taken.

26. The method of claim 24, wherein the full mapping is created by merging data structures ranging in time from a time a point in time map created prior to a snapshot was taken to a time when the snapshot was taken.

27. The method of claim 24, further comprising the step of periodically creating point in time maps to reduce a number of data structures that are needed when performing a restore.

28. The method of claim 22, wherein data on the secondary volume that is outside of the identified APIT window is discarded.

29. The method of claim 22, wherein data on the secondary volume that is outside of the identified APIT window is phased out according to a retention policy.

30. A currently implemented method for continuously protecting data stored on a volume of a storage system, comprising:
- writing data to a primary volume in a block-based order;
- duplicating the data to a write log in a sequential order;
- creating a block-ordered mapping data structure from the write log, the block-ordered mapping data structure stored on a secondary volume and used to track changed in the data between two points in time, whereby the data is continuously protected; and
- merging the mapping data structures that protect contiguous points in time, whereby fewer mapping data structure are needed to protect the data between the same two points in time spanning the merged mapping data structures.

31. The method according to claim 30, wherein the two points in time can be any points in time during which the data is protected.

32. The method according to claim 30, further comprising:
- creating an initial full copy snapshot of the primary volume such that changes to the data are relative to the data in the initial full copy snapshot.

33. The method according to claim 30, further comprising:
- creating a snapshot of the primary volume at a point in time by inserting a marker into the write log to identify the point in time.

* * * * *